United States Patent
Li et al.

(10) Patent No.: US 12,502,153 B2
(45) Date of Patent: Dec. 23, 2025

(54) SYSTEMS AND METHODS FOR MEDICAL IMAGING

(71) Applicants: SHANGHAI UNITED IMAGING HEALTHCARE CO., LTD., Shanghai (CN); WEST CHINA HOSPITAL, SICHUAN UNIVERSITY, Sichuan (CN)

(72) Inventors: Zhenlin Li, Chengdu (CN); Xiaoming Wu, Shanghai (CN)

(73) Assignees: SHANGHAI UNITED IMAGING HEALTHCARE CO., LTD., Shanghai (CN); WEST CHINA HOSPITAL, SICHUAN UNIVERSITY, Chengdu (CN)

( * ) Notice: Subject to any disclaimer, the term of this patent is extended or adjusted under 35 U.S.C. 154(b) by 184 days.

(21) Appl. No.: 18/544,374

(22) Filed: Dec. 18, 2023

(65) Prior Publication Data
US 2024/0115226 A1   Apr. 11, 2024

Related U.S. Application Data

(63) Continuation of application No. PCT/CN2022/099825, filed on Jun. 20, 2022.

(30) Foreign Application Priority Data
Jun. 18, 2021   (CN) .......................... 202110680250.4

(51) Int. Cl.
A61B 5/00      (2006.01)
A61B 6/00      (2006.01)
A61B 6/04      (2006.01)

(52) U.S. Cl.
CPC .............. *A61B 6/54* (2013.01); *A61B 6/0407* (2013.01); *A61B 6/4435* (2013.01)

(58) Field of Classification Search
CPC ......... A61B 5/748; A61B 6/548; A61B 6/032; A61B 6/547; A61B 5/0035; A61B 5/0037;
(Continued)

(56) References Cited

U.S. PATENT DOCUMENTS

2007/0189445 A1   8/2007   Haras et al.
2010/0183206 A1   7/2010   Carlsen et al.
(Continued)

FOREIGN PATENT DOCUMENTS

CN   103908285 A   7/2014
CN   107403287 A   11/2017
(Continued)

OTHER PUBLICATIONS

International Search Report in PCT/CN2022/099825 mailed on Sep. 23, 2022, 5 pages.
(Continued)

*Primary Examiner* — Don K Wong
(74) *Attorney, Agent, or Firm* — METIS IP LLC

(57) ABSTRACT

The present disclosure is related to systems and methods for medical imaging. The method includes determining a sequence of scan states of a medical device for a sequence of regions of interest (ROIs) of a subject. Each of the sequence of scan states corresponds to an ROI in the sequence of ROIs. When the medical device is in a scan state of the sequence of scan states, an isocenter of the medical device is aligned with a center of the corresponding ROI. The method includes generating a set of controlling information of the medical device based on the sequence of scan states. Each of the set of controlling information is configured to switch the medical device to a corresponding scan state in the sequence of scan states. The method includes controlling the medical device to scan the sequence of ROIs.
(Continued)

Before scanning each of the sequence of ROIs, the medical device is positioned to the corresponding scan state according to the corresponding controlling information.

20 Claims, 5 Drawing Sheets

(58) Field of Classification Search
CPC ......... A61B 5/7485; A61B 6/488; A61B 6/54; A61B 6/545; G16H 40/63; G16H 30/20
See application file for complete search history.

(56) References Cited

U.S. PATENT DOCUMENTS

| | | | |
|---|---|---|---|
| 2014/0364720 A1 | 12/2014 | Darrow et al. | |
| 2015/0164460 A1 | 6/2015 | Liu | |
| 2020/0268251 A1* | 8/2020 | Hao | A61B 5/1114 |
| 2020/0268339 A1* | 8/2020 | Hao | A61B 6/544 |
| 2021/0137481 A1 | 5/2021 | Ozawa et al. | |
| 2022/0022837 A1 | 1/2022 | Li et al. | |
| 2023/0157660 A1 | 5/2023 | Tu et al. | |
| 2023/0181144 A1 | 6/2023 | Sun et al. | |

FOREIGN PATENT DOCUMENTS

| | | | |
|---|---|---|---|
| CN | 109381212 | A | 2/2019 |
| CN | 109480882 | A | 3/2019 |
| CN | 110570483 | A | 12/2019 |
| CN | 111374690 | A | 7/2020 |
| CN | 112450956 | A | 3/2021 |
| CN | 112472110 | A | 3/2021 |
| CN | 112741643 | A | 5/2021 |
| CN | 112957059 | A | 6/2021 |
| CN | 113647967 | A | 11/2021 |
| JP | 2010136949 | A | 6/2010 |
| WO | 2020148192 | A1 | 7/2020 |
| WO | 2022262871 | A1 | 12/2022 |

OTHER PUBLICATIONS

Written Opinion in PCT/CN2022/099825 mailed on Sep. 23, 2022, 6 pages.

* cited by examiner

SYSTEMS AND METHODS FOR MEDICAL IMAGING

CROSS-REFERENCE TO RELATED APPLICATIONS

This application is a continuation of International Application No. PCT/CN2022/099825, filed on Jun. 20, 2022, which claims priority of Chinese Patent Application No. 202110680250.4, filed on Jun. 18, 2021, and the contents of each of which are hereby incorporated by reference.

TECHNICAL FIELD

This disclosure generally relates to systems and methods for medical imaging, and more particularly, relates to systems and methods for scanning a sequence of regions of interest (ROIs) of a subject.

BACKGROUND

Medical systems (e.g., a CT device) are widely used for creating images of a patient's body, especially for internal structures, for medical diagnosis and/or treatment purposes. Generally, before a scan of each region of interest (ROI) of a sequence of ROIs of a subject, position(s) of the supporting component(s) (e.g., a scanning table, a gantry) of a medical device can be adjusted such that an isocenter of the medical device is aligned with a center of the ROI. The center of each ROI of the sequence of ROIs may be different. The quality of reconstructed images and the accuracy of dose distribution rely on the fast and correct determination of the center of each ROI and the precise alignment of the center of each ROI with the isocenter of the medical device during the scan of the sequence of ROIs. Therefore, it is desirable to provide systems and methods for positioning and scanning a sequence of ROIs of a subject in an imaging and/or treatment process accurately and efficiently.

SUMMARY

According to an aspect of the present disclosure, a method may be implemented on a computing device having one or more processors and one or more storage devices. The method may include determining a sequence of scan states of a medical device for a sequence of regions of interest (ROIs) of a subject. Each of the sequence of scan states may correspond to an ROI in the sequence of ROIs. When the medical device is in a scan state of the sequence of scan states, an isocenter of the medical device may be aligned with a center of the corresponding ROI. The method may include generating a set of controlling information of the medical device based on the sequence of scan states. Each of the set of controlling information may be configured to switch the medical device to a corresponding scan state in the sequence of scan states. The method may include controlling the medical device to scan the sequence of ROIs. Before scanning each of the sequence of ROIs, the medical device may be positioned to the corresponding scan state according to the corresponding controlling information.

In some embodiments, the method may include obtaining image data of the subject. The method may include obtaining the sequence of ROIs of the subject based on the image data of the subject. Each ROI of the sequence of ROIs may correspond to a scan protocol. The scan protocol may be used for the medical device to perform a scan on the ROI.

In some embodiments, the image data may include a topogram image or a depth image. The depth image may be acquired by an image capturing device. The method may include, for each ROI of the sequence of ROIs, identifying scan information of the ROI based on the image data. The method may include determining the scan state corresponding to the ROI based on the scan information of the ROI, wherein the scan state of the medical device includes position information of at least one component of the medical device.

In some embodiments, the scan protocol may include at least one of a scan protocol for a plain scan, a scan protocol for an enhanced scan, or a scan protocol for a topogram scan.

In some embodiments, the method may include, for each ROI of the sequence of ROIs, switching the medical device from a previous scan state to a current scan state corresponding to the ROI according to the corresponding controlling information. The method may include controlling the medical device to scan the ROI based on the scan protocol corresponding to the ROI.

In some embodiments, each of the set of controlling information may include at least one control parameter of at least one component of the medical device.

In some embodiments, the medical device may include a scanning table. The method may include switching the medical device from the previous scan state to the current scan state by controlling, based on at least one control parameter of the scanning table, a movement of the scanning table.

In some embodiments, the medical device may include a gantry. The method may include switching the medical device from the previous scan state to the current scan state by controlling, based on at least one control parameter of the gantry, a movement of the gantry.

In some embodiments, the at least one control parameter of the at least one component may be configured to control a moving velocity of the at least one component. The method may include determining whether there is a preset time interval between a first scan protocol corresponding to current controlling information and a second scan protocol corresponding to previous controlling information. The method may include, in response to determining that there is not a preset time interval between the first scan protocol corresponding to the current controlling information and the second scan protocol corresponding to the previous controlling information, determining the at least one control parameter of the at least one component in the current controlling information based on a preset moving velocity of the at least one component.

In some embodiments, the method may include, in response to determining that there is a preset time interval between the first scan protocol corresponding to the current controlling information and the second scan protocol corresponding to the previous controlling information, determining the at least one control parameter of the at least one component in the current controlling information based on the preset time interval.

In some embodiments, the method may include determining whether the medical device can be switched from a previous scan state corresponding to the previous controlling information to a current scan state corresponding to the current controlling information based on the preset time interval and the preset moving velocity of the at least one component. The method may include, in response to determining that the medical device can be switched from the previous scan state corresponding to the previous controlling information to the current scan state corresponding to the current controlling information based on the preset time interval and the preset moving velocity of the at least one component, determining the at least one control parameter of the at least one component in the current controlling information based on the preset moving velocity of the at least one component.

In some embodiments, the method may include, in response to determining that the medical device cannot be switched from the previous scan state corresponding to the previous controlling information to the current scan state corresponding to the current controlling information based on the preset time interval and the preset moving velocity of the at least one component, determining a target moving velocity of the at least one component based on the preset time interval. The method may include determining the at least one control parameter of the at least one component in the current controlling information based on the target moving velocity of the at least one component.

According to another aspect of the present disclosure, a system may include at least one storage device storing a set of instructions, and at least one processor in communication with the at least one storage device. When executing the stored set of instructions, the at least one processor may cause the system to perform a method. The method may include determining a sequence of scan states of a medical device for a sequence of regions of interest (ROIs) of a subject. Each of the sequence of scan states may correspond to an ROI in the sequence of ROIs. When the medical device is in a scan state of the sequence of scan states, an isocenter of the medical device may be aligned with a center of the corresponding ROI. The method may include generating a set of controlling information of the medical device based on the sequence of scan states. Each of the set of controlling information may be configured to switch the medical device to a corresponding scan state in the sequence of scan states. The method may include controlling the medical device to scan the sequence of ROIs. Before scanning each of the sequence of ROIs, the medical device may be positioned to the corresponding scan state according to the corresponding controlling information.

According to another aspect of the present disclosure, a non-transitory computer readable medium may include at least one set of instructions. When executed by at least one processor of a computing device, the at least one set of instructions may cause the at least one processor to effectuate a method. The method may include determining a sequence of scan states of a medical device for a sequence of regions of interest (ROIs) of a subject. Each of the sequence of scan states may correspond to an ROI in the sequence of ROIs. When the medical device is in a scan state of the sequence of scan states, an isocenter of the medical device may be aligned with a center of the corresponding ROI. The method may include generating a set of controlling information of the medical device based on the sequence of scan states. Each of the set of controlling information may be configured to switch the medical device to a corresponding scan state in the sequence of scan states. The method may include controlling the medical device to scan the sequence of ROIs. Before scanning each of the sequence of ROIs, the medical device may be positioned to the corresponding scan state according to the corresponding controlling information.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
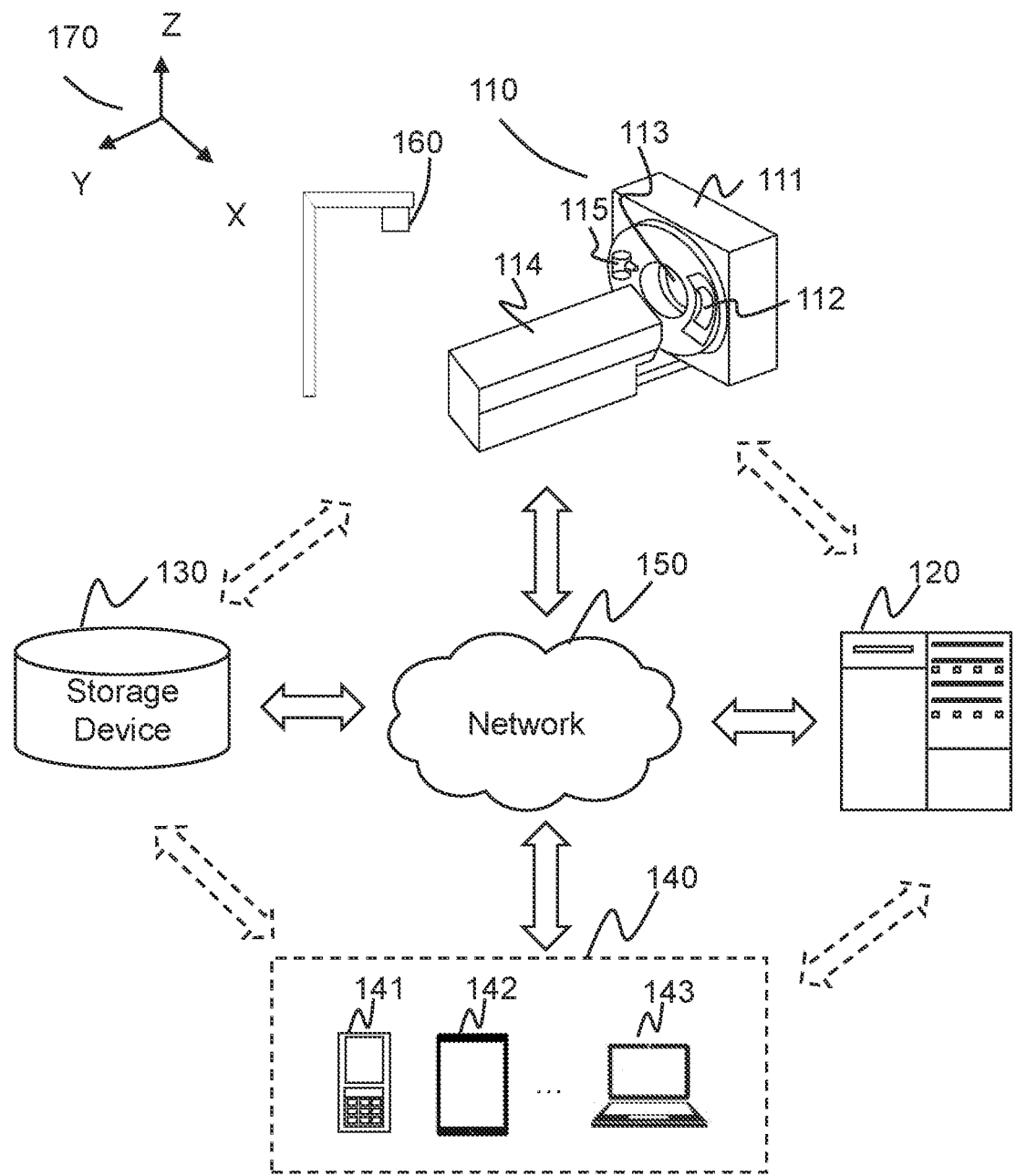
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

An aspect of the present disclosure relates to systems and methods for medical imaging. A processing device may determine a sequence of regions of interest (ROIs) of a subject based on an image of the subject. The processing device may determine a sequence of scan states of a medical device for the sequence of ROIs of the subject. Each of the sequence of scan states may correspond to an ROI in the sequence of ROIs. When the medical device is in a scan state of the sequence of scan states, an isocenter of the medical device may be aligned with a center of the corresponding ROI. The processing device 120 may generate a set of controlling information of the medical device based on the sequence of scan states. Each of the set of controlling information may be configured to switch the medical device to a corresponding scan state in the sequence of scan states. The processing device may control the medical device to scan the sequence of ROIs. Before scanning each of the sequence of ROIs, the medical device may be positioned to the corresponding scan state according to the corresponding controlling information.

Accordingly, the set of controlling information of the medical device may be determined based on the sequence of scan states of the medical device for the sequence of ROIs of the subject, and the sequence of ROIs of the subject may be scanned based on the set of controlling information of the medical device. Before a scan of each ROI of the sequence of ROIs of the subject, the medical device may be switched from a previous scan state to a current scan state corresponding to the ROI according to corresponding controlling information. The ROI may then be scanned by the medical device based on a scan protocol corresponding to the ROI.

Conventionally, a laser positioning light located on a gantry of a medical device may be used to position an isocenter of the medical device. A user (e.g., a doctor, a technician, an operator) of the medical device may manually adjust position(s) of component(s) of the medical device to align the isocenter of the medical device with a center of an ROI of a subject. However, since the center of the ROI is located inside the body of the subject, it is difficult for the user to accurately determine the center of the ROI with the naked eye. In addition, in a multi-region scan of the subject, the center of each ROI of a sequence of ROIs may be different, and it is difficult for the user to align the isocenter of the medical device with the center of each ROI manually. As used herein, a multi-region scan refers to that a plurality of ROIs of a subject need to be scanned in sequence (also referred to as a sequence of ROIs) during a scan process of the subject.

Compared to the conventional way, the systems and methods of the present disclosure may be implemented with reduced or minimal or without user intervention, which is more efficient and accurate by, e.g., reducing the workload of a user, cross-user variations, and the time needed for the scan preparation and the positioning adjustment during the scan.

FIG. 1 is a schematic diagram illustrating an exemplary medical system 100 according to some embodiments of the present disclosure. As shown, the medical system 100 may include a medical device 110, a processing device 120, a storage device 130, one or more terminals 140, a network 150, and an image capturing device 160. In some embodiments, the medical device 110, the processing device 120, the storage device 130, the terminal(s) 140, and/or the image capturing device 160 may be connected to and/or communicate with each other via a wireless connection, a wired connection, or a combination thereof. The connection between the components of the medical system 100 may be variable. Merely by way of example, the medical device 110 may be connected to the processing device 120 through the network 150 or directly. As a further example, the storage device 130 may be connected to the processing device 120 through the network 150 or directly.

The medical device 110 may generate or provide image data related to a subject via scanning the subject. In some embodiments, the subject may include a biological subject and/or a non-biological subject. For example, the subject may include a specific portion of a body, such as the head, the thorax, the abdomen, or the like, or a combination thereof. As another example, the subject may be a man-made composition of organic and/or inorganic matters that are with or without life.

In some embodiments, the medical device 110 may be a non-invasive biomedical medical device for disease diagnostic or research purposes. The medical device 110 may include a single modality scanner and/or a multi-modality scanner. The single modality scanner may include, for example, an ultrasound scanner, an X-ray scanner, a computed tomography (CT) scanner, a magnetic resonance imaging (MRI) scanner, an ultrasonography scanner, a positron emission tomography (PET) scanner, an optical coherence tomography (OCT) scanner, an ultrasound (US) scanner, an intravascular ultrasound (IVUS) scanner, a near infrared spectroscopy (NIRS) scanner, a far infrared (FIR) scanner, or the like, or any combination thereof. The multi-modality scanner may include, for example, an X-ray imaging-magnetic resonance imaging (X-ray-MRI) scanner, a positron emission tomography-X-ray imaging (PET-X-ray) scanner, a single photon emission computed tomography-magnetic resonance imaging (SPECT-MRI) scanner, a positron emission tomography-computed tomography (PET-CT) scanner, a digital subtraction angiography-magnetic resonance imaging (DSA-MRI) scanner, etc. It should be noted that the scanner described above is merely provided for illustration purposes, and not intended to limit the scope of the present disclosure. The term "imaging modality" or "modality" as used herein broadly refers to an imaging method or technology that gathers, generates, processes, and/or analyzes imaging information of a subject.

For illustration purposes, the present disclosure mainly describes systems and methods relating to a CT system. It should be noted that the CT system described below is merely provided as an example, and not intended to limit the scope of the present disclosure. The systems and methods disclosed herein may be applied to any other imaging systems.

In some embodiments, the medical device 110 may include a gantry 111, a detector 112, a detection region 113, a scanning table 114, and a radiation source 115. The gantry 111 may support the detector 112 and the radiation source 115. The subject may be placed on the scanning table 114 and moved into the detection region 113 to be scanned. In some embodiments, the scanning table 114 may be configured to rotate and/or translate along different directions to move the subject to a desired position. For example, the scanning table 114 may be configured to translate along or rotate about one or more of an X-axis, a Y-axis, and a Z-axis of a coordinate system 170 as shown in FIG. 1. The radiation source 115 may emit radioactive rays to the subject. The radioactive rays may include a particle ray, a photon ray, or the like, or a combination thereof. In some embodiments, the radioactive rays may include a plurality of radiation particles (e.g., neutrons, protons, electron, p-mesons, heavy ions), a plurality of radiation photons (e.g., X-ray, y-ray, ultraviolet, laser), or the like, or a combination thereof. The detector 112 may detect radiation and/or a radiation event (e.g., gamma photons) emitted from the detection region 113. In some embodiments, the detector 112 may include a plurality of detector units. The detector units may include a scintillation detector (e.g., a cesium iodide detector) or a gas detector. The detector unit may be a single-row detector or a multi-rows detector.

The processing device 120 may process data and/or information obtained from the medical device 110, the storage device 130, the terminal(s) 140, and/or the image capturing device 160. For example, the processing device 120 may determine a sequence of scan states of a medical device for a sequence of ROIs of a subject. As another example, the processing device 120 may generate a set of controlling information of a medical device based on a sequence of scan states. As another example, the processing device 120 may control a medical device to scan a sequence of ROIs. In some embodiments, the processing device 120 may be a single server or a server group. The server group may be centralized or distributed. In some embodiments, the processing device 120 may be local to or remote from the medical system 100. For example, the processing device 120 may access information and/or data from the medical device 110, the storage device 130, the terminal(s) 140, and/or the image capturing device 160 via the network 150. As another example, the processing device 120 may be directly connected to the medical device 110, the terminal(s) 140, the storage device 130, and/or the image capturing device 160 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a computing device 200 having one or more components as described in connection with FIG. 2.

In some embodiments, the processing device 120 may include one or more processors (e.g., single-core processor(s) or multi-core processor(s)). Merely by way of example, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 130 may store data, instructions, and/or any other information. In some embodiments, the storage device 130 may store data obtained from the processing device 120, the terminal(s) 140, the medical device 110, and/or the image capturing device 160. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or any combination thereof.

The terminal(s) 140 may enable user interaction between a user and the medical system 100. In some embodiments, the terminal(s) 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 140 may include an input device, an output device, etc. In some embodiments, the terminal(s) 140 may be part of the processing device 120.

The network 150 may include any suitable network that can facilitate the exchange of information and/or data for the medical system 100. In some embodiments, one or more components of the medical system 100 (e.g., the medical device 110, the processing device 120, the storage device 130, the terminal(s) 140) may communicate information and/or data with one or more other components of the medical system 100 via the network 150. For example, the processing device 120 may obtain image data from the medical device 110 via the network 150. As another example, the processing device 120 may obtain user instruction(s) from the terminal(s) 140 via the network 150.

The image capturing device 160 may be configured to capture image data of the subject before, during, and/or after the medical device 110 performs a scan on the subject. The image capturing device 160 may be and/or include any suitable device that is capable of capturing image data of the subject. For example, the image capturing device 160 may include a camera (e.g., a digital camera, an analog camera, etc.), a red-green-blue (RGB) sensor, an RGB-depth (RGB-D) sensor, or another device that can capture color image data of the subject. As another example, the image capturing device 160 may be used to acquire point-cloud data of the subject. The point-cloud data may include a plurality of data points, each of which may represent a physical point on a body surface of the subject and can be described using one or more feature values of the physical point (e.g., feature values relating to the position and/or the composition of the physical point). Exemplary image capturing devices 160 capable of acquiring point-cloud data may include a 3D scanner, such as a 3D laser imaging device, a structured light scanner (e.g., a structured light laser scanner). Merely by way of example, a structured light scanner may be used to execute a scan on the subject to acquire the point cloud data. During the scan, the structured light scanner may project structured light (e.g., a structured light spot, a structured light grid) that has a certain pattern toward the subject. The point-cloud data may be acquired according to the structure light projected on the subject. As yet another example, the image capturing device 160 may be used to acquire depth image data of the subject. The depth image data may refer to image data that includes depth information of each physical point on the body surface of the subject, such as a distance from each physical point to a specific point (e.g., an optical center of the image capturing device 160). The depth image data may be captured by a range sensing device, e.g., a structured light scanner, a time-of-flight (TOF) device, a stereo triangulation camera, a sheet of light triangulation device, an interferometry device, a coded aperture device, a stereo matching device, or the like, or any combination thereof.

In some embodiments, the image capturing device 160 may be a device independent from the medical device 110 as shown in FIG. 1. For example, the image capturing device 160 may be a camera mounted on the ceiling in an examination room where the medical device 110 is located. Alternatively, the image capturing device 160 may be integrated into or mounted on the medical device 110 (e.g., the gantry 111). In some embodiments, the image data acquired by the image capturing device 160 may be transmitted to the processing device 120 for further analysis. Additionally or alternatively, the image data acquired by the image capturing device 160 may be transmitted to a terminal device (e.g., the terminal(s) 140) for display and/or a storage device (e.g., the storage device 130) for storage.

In some embodiments, the image capturing device 160 may be configured to capture image data of the subject continuously or intermittently (e.g., periodically) before, during, and/or after a scan of the subject performed by the medical device 110. In some embodiments, the acquisition of the image data by the image capturing device 160, the transmission of the captured image data to the processing device 120, and the analysis of the image data may be performed substantially in real time so that the image data may provide information indicating a substantially real time status of the subject.

In some embodiments, a coordinate system may be provided for the medical system 100 to define a position of a component (e.g., an absolute position, a position relative to another component) and/or a movement of the component. For illustration purposes, the coordinate system 170 may include the X-axis, the Y-axis, and the Z-axis. The X-axis and the Y-axis shown in FIG. 1 may be horizontal, and the Z-axis may be vertical. As illustrated, a positive X direction along the X-axis may be from the left side to the right side of the scanning table 114 viewed from the direction facing the front of the medical device 110; a positive Y direction along the Y-axis may be the direction in which the scanning table 114 is moved from the medical system 100 to the outside viewed from the direction facing the front of the medical device 110; and a positive Z direction along the Z-axis may be from the lower part (or from the floor where the medical system 100 stands) to the upper part of the gantry 111.

It should be noted that the above description of the medical system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the medical system 100 may include one or more additional components. Additionally or alternatively, one or more components of the medical system 100, such as the image capturing device 160 described above may be omitted. As another example, two or more components of the medical system 100 may be integrated into a single component. Merely by way of example, the processing device 120 (or a portion thereof) may be integrated into the medical device 110 or the image capturing device 160. In some embodiments, the medical system 100 may further include a treatment device, such as a radiotherapy device.

Figure 2:
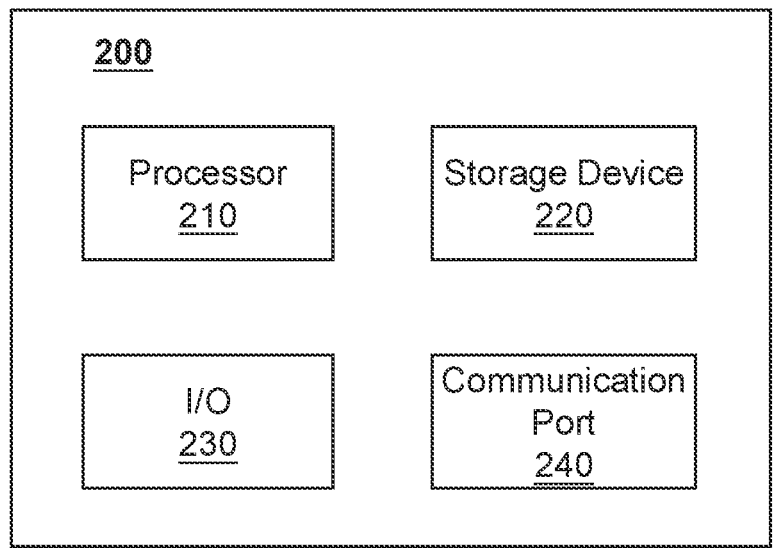
FIG. 2 is a schematic diagram illustrating exemplary hardware and/or software components of an exemplary computing device on which the processing device 120 may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, a storage device 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal 140, the storage device 130, and/or any other component of the medical system 100.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage device 220 may store data/information obtained from the medical device 110, the terminal 140, the storage device 130, and/or any other component of the medical system 100. The storage device 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device.

The communication port 240 may be connected to a network (e.g., the network 150) to facilitate data communications. The communication port 240 may establish connections between the processing device 120 and the medical device 110, the terminal 140, and/or the storage device 130. The connection may be a wired connection, a wireless connection, any other communication connection that can enable data transmission and/or reception, and/or any combination of these connections.

Figure 3:
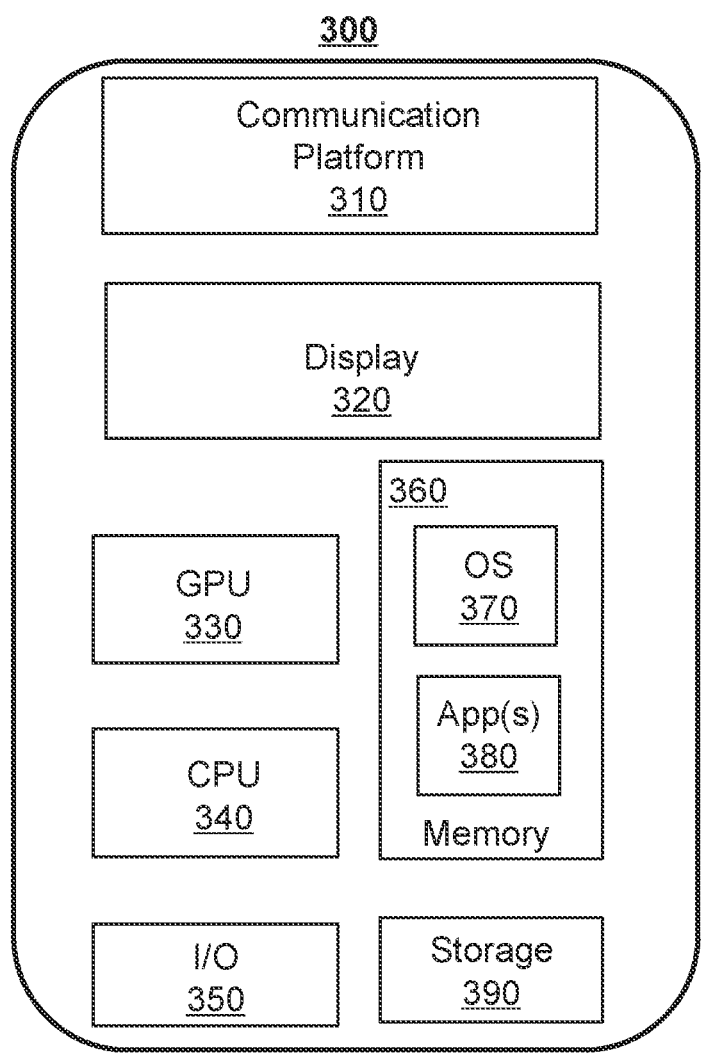
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the medical system 100, and enable data and/or signal to be transmitted between the mobile device 300 and other components of the medical system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the medical system 100. For example, the communication platform 310 may transmit data and/or signals inputted by a user to other components of the medical system 100. The inputted data and/or signals may include a user instruction. As another example, the communication platform 310 may receive data and/or signals transmitted from the processing device 120. The received data and/or signals may include imaging data acquired by the medical device 110.

In some embodiments, a mobile operating system (OS) 370 (e.g., iOS™ Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the medical system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
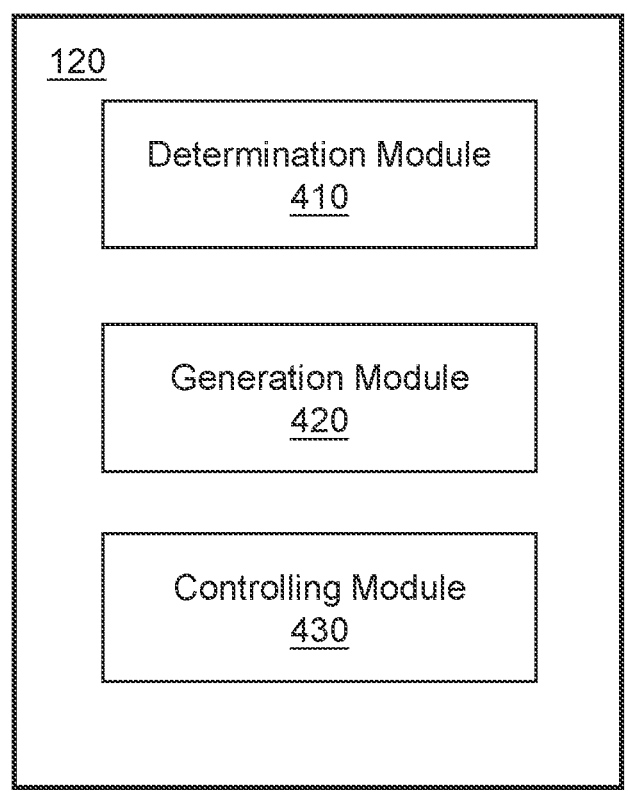
FIG. 4 is a schematic diagram illustrating an exemplary processing device according to some embodiments of the present disclosure.

FIG. 4 is a schematic diagram illustrating an exemplary processing device according to some embodiments of the present disclosure. In some embodiments, the processing device 120 may include a determination module 410, a generation module 420, and a controlling module 430.

The determination module 410 may be configured to determine data and/or information of the medical system 100. The data and/or the information of the medical system 100 may include image data of a subject, a sequence of ROIs of a subject, or the like, or any combination thereof. For example, the determination module 410 may obtain a sequence of ROIs of a subject based on image data of the subject. More descriptions for obtaining a sequence of ROIs of a subject may be found elsewhere in the present disclosure (e.g., operation 510 in FIG. 5 and descriptions thereof). As another example, the determination module 410 may determine a sequence of scan states of a medical device for a sequence of ROIs of a subject. More descriptions for determining a sequence of scan states of a medical device for a sequence of ROIs of a subject may be found elsewhere in the present disclosure (e.g., operation 520 in FIG. 5 and descriptions thereof).

The generation module 420 may be configured to generate a set of controlling information of a medical device. In some embodiments, the generation module 420 may generate a set of controlling information of a medical device based on a sequence of scan states. More descriptions for determining a set of controlling information of a medical device may be found elsewhere in the present disclosure (e.g., operation 530 in FIG. 5, FIG. 6, and descriptions thereof).

The controlling module 430 may be configured to control one or more components of a medical device. In some embodiments, the controlling module 430 may control a medical device to scan a sequence of ROIs. More descriptions for controlling a medical device to scan a sequence of ROIs may be found elsewhere in the present disclosure (e.g., operation 540 in FIG. 5 and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the determination module 410 and the generation module 420 may be combined into a single module. In some embodiments, one or more modules may be added or omitted in the processing device 120. For example, the processing device 120 may further include a storage module (not shown in FIG. 4) configured to store data and/or information (e.g., a sequence of ROIs of a subject, a sequence of scan states of a medical device, a set of controlling information of a medical device) associated with the medical system 100.

Figure 5:
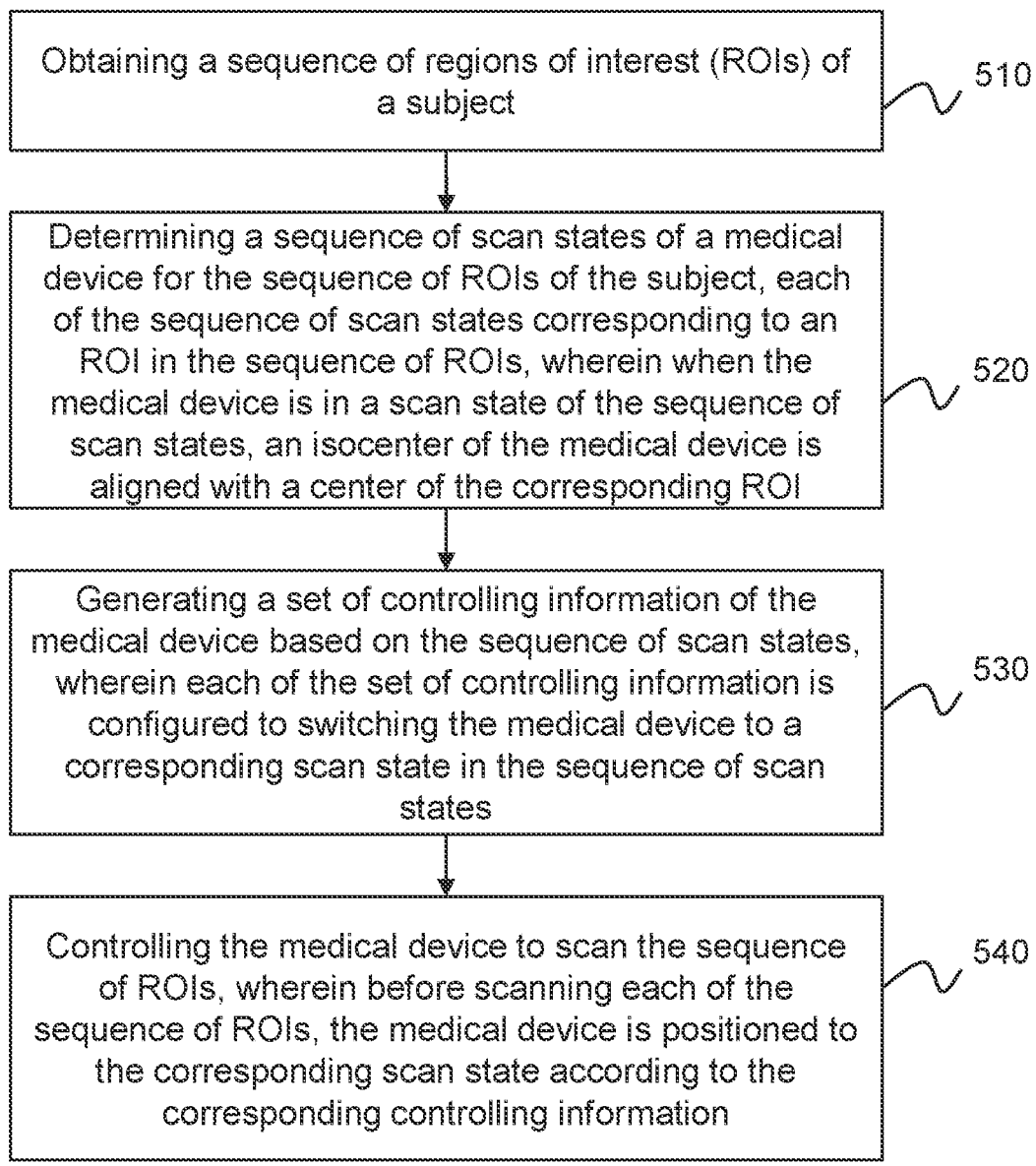
FIG. 5 is a flowchart illustrating an exemplary process for medical imaging according to some embodiments of the present disclosure.

FIG. 5 is a flowchart illustrating an exemplary process for medical imaging according to some embodiments of the present disclosure. In some embodiments, process 500 may be executed by the medical system 100. For example, the process 500 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the determination module 410) may obtain a sequence of regions of interest (ROIs) of a subject.

In some embodiments, the processing device 120 may obtain image data of the subject. The image data of the subject refers to image data corresponding to the entire subject or image data corresponding to a portion of the subject. In some embodiments, the image data of the subject may include a two-dimensional (2D) image, a three-dimensional (3D) image, a four-dimensional (4D) image (e.g., a series of 3D images over time), and/or any related image data. In some embodiments, the image data of the subject may include color image data, point-cloud data, depth image data, mesh data, scan data, projection data, or the like, or any combination thereof, of the subject.

In some embodiments, the image data of the subject may be obtained by a medical device (e.g., the medical device 110). For example, the image data may be a topogram image of the subject obtained by the medical device (e.g., the medical device 110). The topogram image may be associated with a localizer scan (also referred to as a topogram scan in the present disclosure). The localizer scan may be performed by the medical device (e.g., the medical device 110) when a radiation source is in a stationary position and a scanning table moves along the Y-axis (e.g., the Y-axis as shown in FIG. 1). For example, if the radiation source is positioned above the subject, an anterior—posterior (AP) topogram image may be obtained in a localizer scan. As another example, if the radiation source is positioned on a side of the subject, a lateral topogram image may be obtained in a localizer scan.

In some embodiments, the image data of the subject may be captured by an image capturing device (e.g., the image capturing device 160). For example, a 3D scanner may include a binocular camera and a structured light projector. The structured light projector may project a linear laser to the subject, and the projected linear laser may form a laser projection plane. A scan line may be formed on the surface of the subject when the laser projection plane intersects the subject. The scan line may include a plurality of surface points where the laser projection plane intersects the subject.

Three-dimensional coordinates of the plurality of surface points of the subject may be obtained based on coordinates of points of the scan line. For example, a two-dimensional image of the scan line may be obtained by mapping the three-dimensional coordinates of the plurality of surface points of the subject on the laser projection plane. The three-dimensional coordinates of the plurality of surface points of the subject may be determined based on coordinates of points on the two-dimensional image of the scan line. A model of the subject and/or point-cloud data of the subject may be determined based on the three-dimensional coordinates of the plurality of surface points of the subject.

In some embodiments, the image data may be captured by the image capturing device after the subject is positioned at a scan position for receiving a scan. For example, after the subject is placed on a scanning table of the medical device, the imaging capturing device may be directed to capture the image data of the subject.

In some embodiments, the processing device 120 may obtain the image data from the image capturing device or the medical device. Alternatively, the image data may be acquired by the image capturing device or the medical device, and stored in a storage device (e.g., the storage device 130, the storage 220, the storage 390, or an external source). The processing device 120 may retrieve the image data from the storage device.

In some embodiments, the image data may be original image data captured by the image capturing device or the medical device. Alternatively, the image data may be determined by processing the original image data. For example, the processing device 120 may perform a denoising operation on the original image data to generate denoised image data, and determine the denoised image data as the image data of the subject. As another example, the processing device 120 may perform a gray-scale processing operation on the original image data to generate processed image data, and determine the processed image data as the image data of the subject.

The processing device 120 may obtain the sequence of ROIs of the subject based on the image data of the subject. In some embodiments, the processing device 120 may determine the sequence of ROIs of the subject based on one or more scan protocols of the subject. Each ROI of the sequence of ROIs may correspond to a scan protocol. The scan protocol may be used for the medical device to perform a scan on the corresponding ROI. In some embodiments, the scan protocol may include a portion of the subject to be scanned, a modality of a medical device, value(s) or value range(s) of one or more scanning parameters (e.g., an X-ray tube voltage and/or current, an X-ray tube angle, a scan mode, a table moving speed, a gantry rotation speed, a field of view (FOV)), a source image distance (SID), or the like, or any combination thereof. The scan protocol (or a portion thereof) may be determined manually by a user (e.g., a doctor, a nurse, a technician) or by one or more components (e.g., the processing device 120) of the medical system 100 according to different situations.

In some embodiments, the scan protocol may include a scan protocol for a plain scan, a scan protocol for an enhanced scan, a scan protocol for a topogram scan, or the like. The scan protocol for the plain scan may include a computed tomographic scan protocol. The scan protocol for the enhanced scan may include a scan protocol for a trigger threshold based enhanced scan, a timing enhanced scan, or the like. The scan protocol for the topogram scan may include a scan protocol for a sagittal plane scan, a scan protocol for a coronal plane scan, a scan protocol for a transverse plane scan, or the like. In some embodiments, a multi-region scan may be performed on the subject. In the multi-region scan, the sequence of ROIs may be scanned by the medical device in sequence according to the scan protocols corresponding to the sequence of ROIs. In some embodiments, the scan protocols corresponding to the sequence of ROIs may be the same or different.

In some embodiments, the processing device 120 may identify each ROI of the sequence of ROIs of the subject based on the image data of the subject. The identification of an ROI of the subject may be presented by delineating a center, an outline or contour of the ROI. In some embodiments, the identification of the ROI may be represented by a bounding box, an image annotation, or the like. In some embodiments, the center of the ROI may be a center point of the ROI. For example, the center point of the ROI may be determined based on a centroid of the ROI, or a geometric center of the bounding box of the ROI. In some embodiments, the center of the ROI may be a center axis of the ROI. For example, during a CT scan, the subject supported on a scanning table may move along a scan axis direction (e.g., the Y-axis direction as illustrated in FIG. 1) of the CT device, and the center axis of the ROI may be parallel or coincident with the scan axis direction of the medical device.

In some embodiments, the processing device 120 may identify the sequence of ROIs based on the image data of the subject using one or more ROI identification models. The ROI identification model refers to a model (e.g., a machine learning model) or an algorithm for determining one or more ROIs of a subject based on image data of the subject. For example, the processing device 120 may input the image data of the subject into the ROI identification model, and the ROI identification model may output identification of the one or more ROIs of the subject by processing the image data.

In some embodiments, the ROI identification model may be determined by training one or more preliminary models using a plurality of training samples. In some embodiments, the processing device 120A may train the one or more preliminary models to generate the ROI identification model according to a machine learning algorithm. The machine learning algorithm may include an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the ROI identification model may be a supervised learning algorithm, a semi-supervised learning algorithm, an unsupervised learning algorithm, or the like.

In some embodiments, the processing device 120 may identify the sequence of ROIs based on feature information of each of the sequence of ROIs. The feature information of the ROI may include a shape of the ROI, a type of the ROI (e.g., a type of tissue to which the ROI belongs), an X-ray beam absorption ability of the ROI, or the like. In some embodiments, the processing device 120 may identify the sequence of ROIs based on the feature information of the sequence of ROIs and element information associated with at least one element of the image data of the subject. For example, the processing device 120 may obtain the element information associated with the at least one element of the image data. The processing device 120 may further identify the sequence of ROIs based on the element information. As used herein, an element of image data refers to a pixel or a voxel of the image data. The element information of the element may include a gray value of the element or a Hounsfield unit (HU) value corresponding to the element. As used herein, Hounsfield unit (HU) refers to a dimensionless unit used in computed tomography (CT) scanning to express CT numbers in a standardized and convenient form. The HU value of an element may correspond to an X-ray beam absorption (or tissue density) of the element. The HU value of an element may indicate the type of tissue to which the element belongs. Elements with similar HU values may belong to similar tissue types. Merely by way of example, more dense tissue (e.g., a skeleton), with greater X-ray beam absorption, may have positive values and appears bright in a CT image; while less dense tissue (e.g., a lung filled with gas), with less X-ray beam absorption, may have negative values and appears dark in a CT image. In some embodiments, the HU value of an element may be represented as a gray value of the element on a visual interface (e.g., the screen of the user terminal). A higher HU value of an element may correspond to a higher gray value and a brighter element in a CT image.

In some embodiments, the processing device 120 may determine a scan range of each ROI of the sequence of ROIs. In some embodiments, the scan range of the ROI may be defined by a scan start position, a scan end position, or the like, or any combination thereof. In some embodiments, the processing device 120 may determine a range that encloses the ROI as the scan range of the ROI.

In some embodiments, the identification of the sequence of ROIs and/or the determination of the scan range of each ROI of the sequence of ROIs may be performed without user intervention. For example, the processing device 120 may automatically determine the sequence of ROIs based on the image data according to the scan protocols of the subject. Alternatively, the determination of the sequence of ROIs may be performed semi-automatically by the processing device 120 with user intervention. For example, a user may provide information, and the processing device 120 may determine the scan region according to the information provided by the user. Exemplary information provided by the user may include a position parameter relating to an ROI, an adjustment to, or rejection or confirmation of a preliminary ROI generated by the processing device 120, etc. Alternatively, the determination of the sequence of ROIs may be performed manually by a user. In some embodiments, the processing device 120 may cause a terminal device to display the image data of the subject. The user may select the ROI on the image data displayed on the terminal device (e.g., the interface of the terminal device) via an input component of the terminal device (e.g., a mouse, a touch screen). For example, the user may draw a bounding box on the image data to select the ROI. Alternatively, the user may specify a plurality of reference points on the display image to select the ROI. An area enclosing the plurality of reference points may be determined as the ROI in the image data.

In some embodiments, after the sequence of ROIs of the subject are identified in the image data of the subject, the processing device 120 may obtain position information of the sequence of ROIs of the subject in the coordinate system associated with the medical device (e.g., the coordinate system 170 as shown in FIG. 1) based on position information of representations of the sequence of ROIs in the image data. For example, the processing device 120 may determine the position information of the sequence of ROIs in the coordinate system associated with the medical device (e.g., the coordinate system 170 as shown in FIG. 1) based on the position information of the representations of the sequence of ROIs in the image data of the subject (i.e., position information of the representations of the sequence of ROIs in an image coordinate system) and a mapping relationship between the image coordinate system and the coordinate system associated with the medical device (e.g., the coordinate system 170 as shown in FIG. 1). As used herein, an image coordinate system refers to a coordinate system that describes positions of an object in an image captured by an image capturing device.

In 520, the processing device 120 (e.g., the determination module 410) may determine a sequence of scan states of a medical device for theسequence of ROIs of the subject. Each of the sequence of scan states may correspond to an ROI in the sequence of ROIs. When the medical device is in a scan state of the sequence of scan states, an isocenter of the medical device may be aligned with a center of the corresponding ROI.

The medical device may be used to perform a scan on the subject. In some embodiments, the medical device (e.g., the medical device 110) may be an X-ray imaging device (e.g., a suspended X-ray imaging device, a C-arm X-ray imaging device), a digital radiography (DR) device (e.g., a mobile digital X-ray imaging device), a CT device (e.g., a CBCT device, an MSCT device), a PET device, an MRI device, or the like, as described elsewhere in the present disclosure.

In some embodiments, the medical device may have an isocenter. As used herein, an isocenter of a medical device refers to a mechanical isocenter of the medical device. For example, for an X-ray imaging device having a gantry (e.g., a cylindrical gantry, a C-shape gantry), the isocenter of the X-ray imaging device may be the center of the gantry. In some embodiments, a position of the isocenter may be determined based on a position of a component (e.g., the C-shape gantry) of the medical device in the coordinate system associated with the medical device (e.g., the coordinate system 170 as shown in FIG. 1) and a position of the isocenter relative to the component of the medical device. For example, the processing device 120 may obtain image data of the medical device from an image capturing device (e.g., the image capturing device 160). The processing device 120 may identify representations of one or more components of the medical device in the image data of the medical device. The processing device 120 may determine position information of the one or more components of the medical device in the coordinate system associated with the medical device (e.g., the coordinate system 170 as shown in FIG. 1) based on position information of the representations of the one or more components of the medical device in the image coordinate system and a mapping relationship between the image coordinate system and the coordinate system associated with the medical device (e.g., the coordinate system 170 as shown in FIG. 1). The processing device 120 may determine the position of the isocenter in the coordinate system associated with the medical device (e.g., the coordinate system 170 as shown in FIG. 1) based on the position information of the one or more components of the medical device in the coordinate system associated with the medical device (e.g., the coordinate system 170 as shown in FIG. 1).

In some embodiments, the position of the isocenter may be previously determined, for example, when the medical device is mounted, and stored in a storage device (e.g., the storage device 130) of the medical system 100. In some embodiments, the position of the imaging isocenter may be represented by a coordinate in a coordinate system (e.g., the coordinate system 170 as shown in FIG. 1).

In some embodiments, when the medical device is in a scan state of the sequence of scan states, the isocenter of the medical device may be aligned with a center of the corresponding ROI. As used herein, "an isocenter of a medical device is aligned with a center of an ROI" refers to that a position of a center point of the ROI is coincident with a position of the isocenter of the medical device, or a center axis of the ROI (or an extension of the center axis of the ROI) passes through the isocenter of the medical device.

In some embodiments, for each ROI of the sequence of ROIs, the processing device 120 may identify scan information of the ROI based on the image data of the subject. The processing device 120 may determine the scan state corresponding to the ROI based on the scan information of the ROI. The scan information of the ROI may include the position of the center of the ROI, the scan range of the ROI (e.g., the scan start position, the scan end position), or the like, or any combination thereof.

In some embodiments, the processing device 120 may determine a scan state of the medical device for an ROI of the subject based on the position of the isocenter of the medical device, the position of the center of the ROI, and/or the scan start position of the ROI. For example, the processing device 120 may determine the scan state of the medical device for the ROI of the subject based on the position of the isocenter of the medical device and the position of the center of the ROI, such that when the medical device is in the scan state, the isocenter of the medical device is aligned with the center of the ROI. As another example, the processing device 120 may determine the scan state of the medical device for the ROI of the subject based on the position of the isocenter of the medical device, the position of the center of the ROI, and the scan start position of the ROI, such that when the medical device is in the scan state, the isocenter of the medical device is aligned with the scan start position of the ROI, and a center axis of the ROI (or an extension of the center axis of the ROI) passes through the isocenter of the medical device.

In some embodiments, the scan state of the medical device may include position information of at least one component (e.g., a scanning table, a gantry, a detector, a radiation source) of the medical device. The position information of a specific component may include, for example, coordinates of a point of the specific component in a coordinate system (e.g., the coordinate system 170 as shown in FIG. 1). For example, for each ROI, the processing device 120 may determine a position deviation between the position of the center of the ROI and the position of the isocenter of the medical device. The deviation may be represented by, for example, a difference between the coordinates of the center of the ROI and the coordinates of the position of the isocenter of the medical device in the coordinate system 170. The processing device 120 may determine the scan state of the medical device based on the position deviation. In some embodiments, if the subject lies on a scanning table of the medical device, the processing device 120 may determine position information of the scanning table based on the position deviation to move the center of the ROI to the position of the isocenter of the medical device. Alternatively, the processing device 120 may determine position information of the gantry of the medical device based on the position deviation to move the isocenter to the position of center of the ROI. Alternatively, the processing device 120 may determine the position information of the scanning table and the position information of the gantry of the medical device, such that the center of the ROI and the isocenter move to a same position.

In 530, the processing device 120 (e.g., the generation module 420) may generate a set of controlling information of the medical device based on the sequence of scan states.

In some embodiments, each of the set of controlling information may be configured to switch the medical device to a corresponding scan state in the sequence of scan states. Each controlling information may correspond to a scan protocol of a corresponding ROI of the sequence of ROIs. In some embodiments, for each ROI of the sequence of ROIs, the processing device 120 may switch the medical device from a previous scan state to a current scan state corresponding to the ROI according to the corresponding controlling information. For example, the processing device 120 may obtain a first ROI (e.g., the head), a second ROI (e.g., the neck), and a third ROI (e.g., the chest) of the subject based on image data of the subject. The first ROI, the second ROI and the third ROI may be scanned by a medical device in sequence. The processing device 120 may determine a first scan state for the first ROI such that when the medical device is in the first scan state, the isocenter of the medical device is aligned with a center of the first ROI. The processing device 120 may determine a second scan state for the second ROI such that when the medical device is in the second scan state, the isocenter of the medical device is aligned with a center of the second ROI. The processing device 120 may determine a third scan state for the third ROI such that when the medical device is in the third scan state, the isocenter of the medical device is aligned with a center of the third ROI. The processing device 120 may determine first controlling information of the medical device to switch the medical device from an initial state to the first scan state for the first ROI. The processing device 120 may determine second controlling information of the medical device to switch the medical device from the first state to the second scan state for the second ROI. The processing device 120 may determine third controlling information of the medical device to switch the medical device from the second state to the third scan state for the third ROI. In the present disclosure, the first ROI and the second ROI (or the second ROI and the third ROI) may be regarded as adjacent ROIs, the first scan state and the second scan state (or the second scan state and the third scan state) may be regarded as adjacent scan states, and the first controlling information and the second controlling information (or the second controlling information and the third controlling information) may be regarded as adjacent controlling information.

In some embodiments, each of the set of controlling information may include at least one control parameter of at least one component (e.g., a scanning table, a gantry, a detector, a radiation source) of the medical device. The at least one control parameter of the at least one component may be configured to control a movement (e.g., a translational movement, a rotational movement) of the at least one component. In some embodiments, the at least one control parameter of the at least one component may include a moving (e.g., translating, rotating) speed of the at least one component, a moving (e.g., translating, rotating) distance of the at least one component, a moving (e.g., translating, rotating) direction of the at least one component, or the like, or any combination thereof.

In some embodiments, the at least one component of the medical device may include a scanning table. The processing device 120 may switch the medical device from the previous scan state to the current scan state by controlling, based on at least one control parameter of the scanning table, a movement of the scanning table. The at least one control parameter of the scanning table may be configured to control the movement of the scanning table along a plurality of directions (e.g., the X-axis direction, the Y-axis direction, and the Z-axis direction as shown in FIG. 1) to adjust the scan state of the medical device. For example, the at least one control parameter of the scanning table may include a moving displacement of the scanning table in a plane perpendicular to a scan axis direction (e.g., the Y-axis direction as shown in FIG. 1) of the medical device (e.g., a height of the scanning table), such that the isocenter of the medical device may be aligned with the center of the corresponding ROI. As another example, the at least one control parameter of the scanning table may include a moving displacement of the scanning table along the scan axis direction (e.g., the Y-axis direction as shown in FIG. 1) of the medical device, such that the scanning table can move to a scan start position of the corresponding ROI.

In some embodiments, the at least one component of the medical device may include a gantry. The processing device 120 may switch the medical device from the previous scan state to the current scan state by controlling, based on at least one control parameter of the gantry, a movement of the gantry. The at least one control parameter of the gantry may be configured to control the movement of the gantry along a plurality of directions (e.g., the X-axis direction, the Y-axis direction, and the Z-axis direction as shown in FIG. 1) to adjust the scan state of the medical device.

In some embodiments, each controlling information may correspond to a time point. The time point corresponding to the controlling information may be the time point when the controlling information starts to be executed. In some embodiments, the processing device 120 may determine a preset time interval between time points corresponding to adjacent controlling information of the set of controlling information of the medical device (also referred to as a preset time interval between adjacent controlling information for brevity). In some embodiments, a preset time interval between first controlling information and second controlling information may be equal to a time required to execute a scan protocol corresponding to the first controlling information after the first controlling information is completed. As used herein, controlling information being completed refers to that at least one component of the medical device has been controlled based on at least one control parameter of the at least one component in the controlling information, such that the medical device is in a scan state corresponding to the controlling information.

For illustration purposes, the processing device 120 may obtain a first ROI (e.g., the head), and a second ROI (e.g., the neck) of the subject. The first ROI and the second ROI may be scanned by a medical device in sequence. The processing device 120 may determine a first scan state for the first ROI. The processing device 120 may determine a second scan state for the second ROI. The processing device 120 may determine first controlling information of the medical device to switch the medical device from an initial state to the first scan state for the first ROI. The processing device 120 may determine second controlling information of the medical device to switch the medical device from the first state to the second scan state for the second ROI. In some embodiments, the processing device 120 may determine a preset time interval between the first controlling information and the second controlling information based on a time required to execute the first scan protocol. In some embodiments, the processing device 120 may not determine the preset time interval between the first controlling information and the second controlling information. For example, after the first controlling information is completed and the medical device is in the first scan state, a first scan may be performed on the first ROI of the subject according to the first scan protocol, and the second controlling information may be paused. After the first scan is performed on the first ROI of the subject, the second controlling information may be executed to switch the medical device from the first scan state to the second scan state. Further, a second scan may be performed on the second ROI of the subject according to the second scan protocol.

In some embodiments, in a multi-region enhanced CT scan of the subject, due to the limitation of the appearance time of the contrast agent, a preset time interval may be determined between adjacent scan protocols based on a type of the contrast agent, a scan requirement (e.g., a requirement for image quality), or the like, or any combination thereof. That is, an actual time interval between the adjacent scan protocols cannot be longer than the preset time interval to ensure the quality of the image obtained by scanning the subject according to the scan protocols. Merely by way of example, the preset time interval may be 3 seconds, 5 seconds, 12 seconds, or the like.

Figure 6:
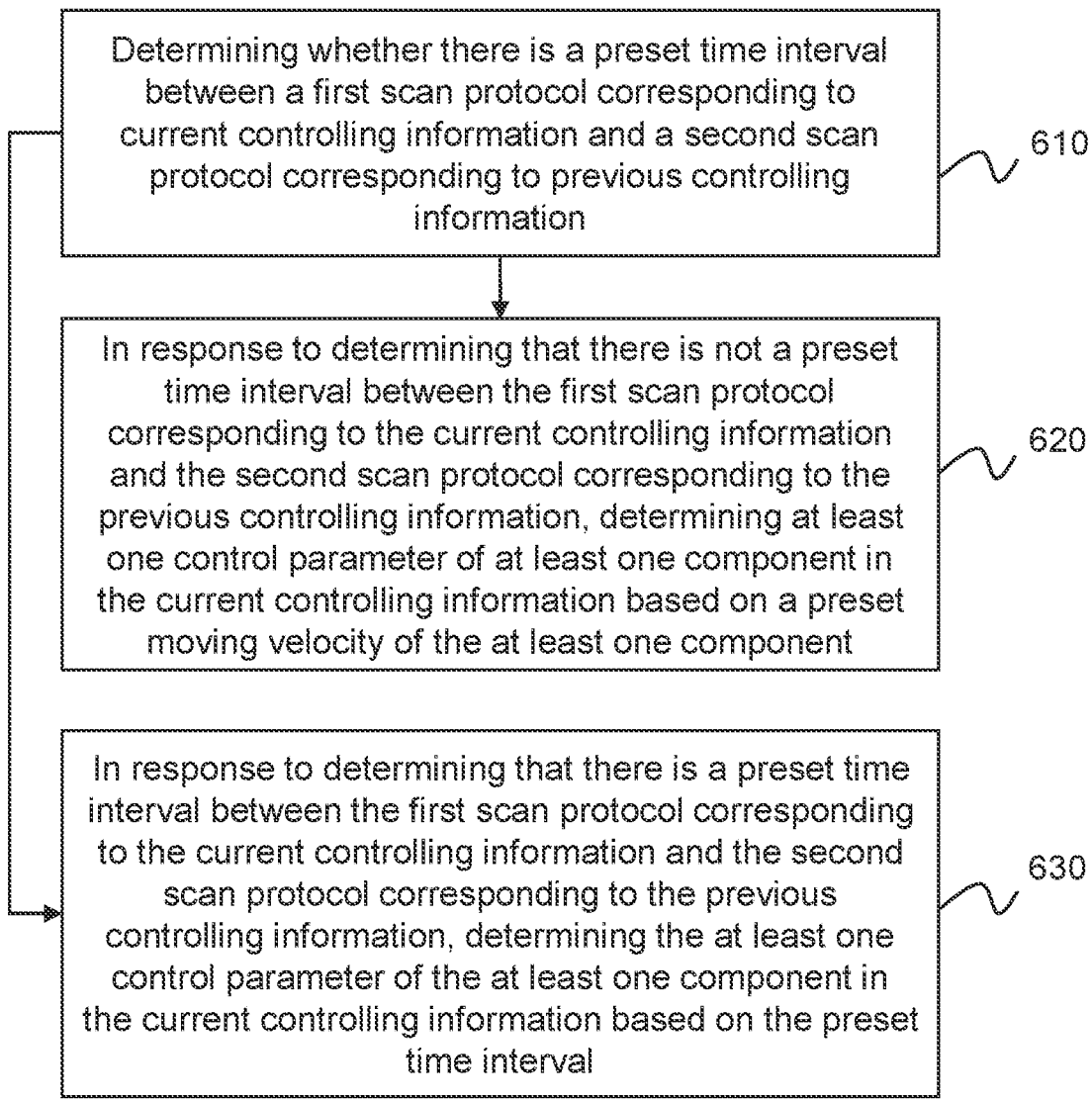
FIG. 6 is a flowchart illustrating an exemplary process for generating a set of controlling information of a medical device according to some embodiments of the present disclosure.

More descriptions for generating a set of controlling information of the medical device based on the sequence of scan states may be found elsewhere in the present disclosure (e.g., FIG. 6 and descriptions thereof).

In 540, the processing device 120 (e.g., the controlling module 430) may control the medical device to scan the sequence of ROIs.

Before scanning each of the sequence of ROIs, the medical device may be positioned to the corresponding scan state according to the corresponding controlling information. Further, the processing device 120 may control the medical device to scan the ROI based on the scan protocol corresponding to the ROI.

In some embodiments, the processing device 120 may obtain first image data of the medical device and second image data of the subject from an image capturing device (e.g., the image capturing device 160). The first image data and the second image data may be the same or different. The processing device 120 may determine a position of the isocenter of the medical device based on the first image data. The ROIs of the subject may include the head and the lungs of the subject. The head may correspond to a first plain scan protocol. The lungs may correspond to a second plain scan protocol. No time interval may be configured between the first plain scan protocol and the second plain scan protocol. During a scan process of the subject, the processing device 120 may obtain first plain scan protocol and the second plain scan protocol. The processing device 120 may determine that the first ROI is the head and the second ROI is the lungs of the subject based on the first plain scan protocol and the second plain scan protocol. The processing device 120 may determine a center of the first ROI, a scan range (e.g., a scan start position, a scan end position) of the first ROI, a center of the second ROI, and a scan range of the second ROI based on the second image data as described in connection with operation 510. The processing device 120 may determine a first scan state of the medical device for the first ROI based on the center of the first ROI and/or the scan start position of the first ROI, as described in connection with operation 520. The processing device 120 may determine a second scan state of the medical device for the second ROI based on the center of the second ROI and/or the scan start position of the second ROI, as described in connection with operation

520. The processing device 120 may generate first controlling information of the medical device based on first scan state. The first controlling information may be configured to switch the medical device to the first scan state. The processing device 120 may generate second controlling information of the medical device based on second scan state. The second controlling information may be configured to switch the medical device to the second scan state. No time interval may be configured between the first controlling information and the second controlling information. The processing device 120 may switch the medical device from an initial state to the first scan state according to at least one control parameter of at least one component of the medical device in the first controlling information. The processing device 120 may control the medical device to scan the head of the subject based on the first plain scan protocol. After the scan of the head of the subject is completed, the processing device 120 may switch the medical device from the first scam state to the second scan state according to at least one control parameter of the at least one component in the second controlling information. The processing device 120 may control the medical device to scan the lungs of the subject based on the second plain scan protocol.

In some embodiments, the processing device 120 may switch the scan state of the medical device by controlling a movement of a scanning table of the medical device along different directions (e.g., the X-axis direction, the Y-direction, and the Z-axis direction of the coordinate system 170 as shown in FIG. 1). For example, after the scan of the first ROI of the subject is completed, the movement of the scanning table along the Y-axis direction of the coordinate system 170 may be stopped, and the scanning table may be moved along the Z-axis direction of the coordinate system 170 such that a center axis of the second ROI (or an extension of the center axis of the second ROI) passes through the isocenter of the medical device. The scanning table may then be moved along the Y-axis direction of the coordinate system 170 such that the scan start position of the second ROI can be scanned by the medical device (e.g., the isocenter of the medical device is aligned with the scan start position of the second ROI). As another example, after the scan of the first ROI of the subject is completed, the scanning table may be moved along the Y-axis direction and the Z-axis direction of the coordinate system 170 simultaneously, such that the center axis of the second ROI (or the extension of the center axis of the second ROI) passes through the isocenter of the medical device, and the scan start position of the second ROI can be scanned by the medical device.

In some embodiments, the processing device 120 may obtain first image data of the medical device and second image data of the subject from an image capturing device (e.g., the image capturing device 160). The first image data and the second image data may be the same or different. The processing device 120 may determine a position of the isocenter of the medical device based on the first image data. The ROIs of the subject may include the head and the lungs of the subject. The head may correspond to a first enhanced scan protocol. The lungs may correspond to a second enhanced scan protocol. A first preset time interval may be configured between the first enhanced scan protocol and the second enhanced scan protocol. During a scan process of the subject, the processing device 120 may obtain the first enhanced scan protocol and the second enhanced scan protocol. The processing device 120 may determine that the first ROI is the head and the second ROI is the lungs of the subject based on the first enhanced scan protocol and the second enhanced scan protocol. The processing device 120 may determine a center of the first ROI, a scan range (e.g., a scan start position, a scan end position) of the first ROI, a center of the second ROI, and a scan range of the second ROI based on the second image data, as described in connection with operation 510. The processing device 120 may determine a first scan state of the medical device for the first ROI based on the center of the first ROI and/or the scan start position of the first ROI, as described in connection with operation 520. The processing device 120 may determine a second scan state of the medical device for the second ROI based on the center of the second ROI and/or the scan start position of the second ROI, as described in connection with operation 520. The processing device 120 may generate first controlling information of the medical device based on first scan state. The first controlling information may be configured to switch the medical device to the first scan state. The processing device 120 may generate second controlling information of the medical device based on second scan state. The second controlling information may be configured to switch the medical device to the second scan state. A second preset time interval may be configured between the first controlling information and the second controlling information. The second preset time interval may be the same as the first preset time interval. For example, the processing device 120 may determine whether the medical device can be switched from the first scan state to the second scan state based on the second preset time interval and a preset moving velocity of at least one component of the medical device, as described in connection with operation 530. In response to determining that the medical device cannot be switched from the first scan state to the second scan state based on the second preset time interval and the preset moving velocity of the at least one component of the medical device, the processing device 120 may determine a target moving velocity of the at least one component based on the preset time interval. The processing device 102 may determine at least one control parameter of the at least one component in the second controlling information based on the target moving velocity of the at least one component.

The processing device 120 may switch the medical device from an initial state to the first scan state according to at least one control parameter of the at least one component in the first controlling information. The processing device 120 may control the medical device to scan the first ROI of the subject based on the first enhanced scan protocol. After the scan of the first ROI of the subject is completed, the processing device 120 may switch the medical device from the first scam state to the second scan state according to the at least one control parameter of the at least one component in the second controlling information. The processing device 120 may control the medical device to scan the second ROI of the subject based on the second enhanced scan protocol.

In some embodiments, the processing device 120 may switch the scan state of the medical device by controlling a movement of a scanning table of the medical device along different directions (e.g., the X-axis direction, the Y-direction, and the Z-axis direction of the coordinate system 170). For example, after the scan of the first ROI of the subject is completed, a moving speed of the scanning table, a moving distance of the scanning table, a moving direction of the scanning table may be determined such that the isocenter of the medical device is aligned with the center of the second ROI within the second preset time interval. In some embodiments, the scanning table may be moved along the Y-axis direction and the Z-axis direction of the coordinate system 170 simultaneously, which may increase a switching speed of the scan state of the medical device.

In some embodiments, in a scan process of a subject, a topogram scan may be performed on the subject, and a plain scan may be performed on the head of the subject based on the topogram scan. For example, after the subject is positioned on the scanning table of the medical device, the processing device 120 may determine a center V1 of the head and information associated with the topogram scan (e.g., a height V0 of the scanning table, a scan start position H0 of the topogram scan), as described in connection with operation 510. The processing device 120 may determine a first scan state of the medical device for the topogram scan of the subject based on the information associated with the topogram scan. The processing device 120 may generate first controlling information of the medical device based on the first scan state of the medical device. In some embodiments, the information associated with the topogram scan may be displayed on a terminal device of a user (e.g., an operator, a doctor). The user may adjust and/or confirm the information associated with the topogram scan. After the user confirms the information associated with the topogram scan (e.g., by clicking a "confirm" button on an interface of the terminal device), the processing device 120 may control a movement of at least one component (e.g., the scanning table) of the medical device based on the first controlling information. The topogram scan may be performed on the subject to obtain a topogram image of the subject. The topogram image may be displayed on the terminal device of the user. The user may determine and/or adjust a scan range of the head of the subject by zooming in and/or zooming out a bounding box on an interface of the terminal device. For example, the user may determine a scan start position H1 of the plain scan of the head. The processing device 120 may determine a second scan state of the medical device for the plain scan of the head based on the center V1 of the head and the scan start position H1 of the plain scan of the head. The processing device 120 may generate second controlling information of the medical device based on the second scan state of the medical device for the plain scan of the head. The second controlling information may be configured to switch the medical device to the second scan state. In some embodiments, the second controlling information may be displayed on the terminal device of the user. The user may adjust and/or confirm the second controlling information. After the user confirms the second controlling information (e.g., by clicking a "confirm" button on an interface of the terminal device), the processing device 120 may control the movement of the at least one component (e.g., the scanning table) of the medical device based on the second controlling information, and the plain scan may be performed on the head of the subject.

In some embodiments, in a scan process of a subject, a topogram scan may be performed on the subject, a plain scan may be performed on the head and the chest of the subject based on the topogram scan, respectively, and an enhanced scan may be performed on the head and the chest of the subject based on the topogram scan, respectively. For example, after the subject is positioned on the scanning table of the medical device, the processing device 120 may determine a center V1 of the head, a center V2 of the head, and information associated with the topogram scan (e.g., a height V0 of the scanning table, a scan start position H0 of the topogram scan, a scan range of the topogram scan), as described in connection with operation 510. The processing device 120 may determine a first scan state of the medical device for the topogram scan of the subject based on the information associated with the topogram scan. The processing device 120 may generate first controlling information of the medical device based on the first scan state of the medical device. In some embodiments, the information associated with the topogram scan may be displayed on a terminal device of the user. The user may adjust and/or confirm the information associated with the topogram scan. After the user confirms the information associated with the topogram scan (e.g., by clicking a "confirm" button on an interface of the terminal device), the processing device 120 may control the movement of the at least one component (e.g., the scanning table) based on the first controlling information. The topogram scan may be performed on the subject to obtain a topogram image of the subject. The topogram image may be displayed on the terminal device of the user. The user may determine and/or adjust a scan range of the head of the subject by zooming in and/or zooming out a bounding box on an interface of the terminal device. For example, the user may determine a scan start position H1 of the plain scan of the head. The processing device 120 may determine a second scan state of the medical device for the plain scan of the head based on the center V1 of the head and the scan start position H1 of the plain scan of the head. The user may also determine and/or adjust a scan range of the chest of the subject by zooming in and/or zooming out a bounding box on the interface of the terminal device. For example, the user may determine a scan start position H2 of the plain scan of the chest. The processing device 120 may determine a third scan state of the medical device for the plain scan of the chest based on the center V2 of the chest and the scan start position H2 of the plain scan of the chest.

The processing device 120 may generate second controlling information of the medical device based on the second scan state of the medical device for the plain scan of the head. The second controlling information may be configured to switch the medical device to the second scan state. In some embodiments, the second controlling information may be displayed on the terminal device of the user. The user may adjust and/or confirm the second controlling information. After the user confirms the second controlling information (e.g., by clicking a "confirm" button on an interface of the terminal device), the processing device 120 may control the movement of the at least one component (e.g., the scanning table) based on the second controlling information, and the plain scan may be performed on the head of the subject.

The processing device 120 may generate third controlling information of the medical device based on the third scan state of the medical device for the plain scan of the chest. The third controlling information may be configured to switch the medical device to the third scan state. In some embodiments, the third controlling information may be displayed on the terminal device of the user. The user may adjust and/or confirm the third controlling information. After the user confirms the third controlling information (e.g., by clicking a "confirm" button on an interface of the terminal device), the processing device 120 may control the movement of the at least one component (e.g., the scanning table) based on the third controlling information, and the plain scan may be performed on the chest of the subject.

Before the enhanced scan of the subject, a contrast agent may be injected into the subject. In some embodiments, the processing device 120 may determine a fourth scan state of the medical device for the enhanced scan of the head based on the center V1 of the head and the scan start position H1' of the enhanced scan of the head. The scan start position H1' of the enhanced scan of the head may be the same as or different form the scan start position H1 of the plain scan of the head. The processing device 120 may generate fourth controlling information of the medical device based on the fourth scan state of the medical device for the enhanced scan of the head. The processing device 120 may determine a fifth scan state of the medical device for the enhanced scan of the chest based on the center V2 of the chest and the scan start position H2' of the enhanced scan of the chest. The scan start position H2' of the enhanced scan of the chest may be the same as or different form the scan start position H2 of the plain scan of the chest.

The processing device 120 may generate fourth controlling information of the medical device based on the fourth scan state of the medical device for the enhanced scan of the head. The processing device 120 may generate fifth controlling information of the medical device based on the fifth scan state of the medical device for the enhanced scan of the chest. In some embodiments, the fourth controlling information and the fifth controlling information may be displayed on the terminal device of the user. The user may adjust and/or confirm the fourth controlling information and/or the fifth controlling information. After the user confirms the fourth controlling information and/or the fifth controlling information, the processing device 120 may control the movement of the at least one component (e.g., the scanning table) based on the fourth controlling information, and the enhanced scan may be performed on the head of the subject. The processing device 120 may then control the movement of the at least one component (e.g., the scanning table) based on the fifth controlling information and a preset time interval configured between the fourth controlling information and the fifth controlling information, and the enhanced scan may be performed on the chest of the subject.

It should be noted that the above description is merely provided for the purposes of illustration, and not intended to limit the scope of the present disclosure. For example, in the enhanced scan of the head and the chest of the subject, the enhanced scan may be performed on the chest of the subject, and then the enhanced scan may be performed on the head of the subject.

Accordingly, the height of the scanning table may be automatically or semi-automatically adjusted based on positions of a plurality of ROIs of the subject to align the isocenter of the medical device with the center of each ROI of the plurality of ROIs of the subject, which may improve the image quality of the plurality of ROIs and ensure a reasonable dose distribution on the subject. In addition, the number of times the user enters and exits the examination room during the scan process may be reduced, the complexity of the scanning operation may be reduced, and the scan speed and scan throughput may be improved.

According to some embodiments of the present disclosure, the sequence of ROIs of the subject may be obtained based on the image data of the subject, and the sequence of scan states of the medical device for the sequence of ROIs of the subject may be determined. When the medical device is in a scan state of the sequence of scan states, an isocenter of the medical device is aligned with a center of the corresponding ROI. The set of controlling information of the medical device may be determined based on the sequence of scan states of the medical device for the sequence of ROIs of the subject, and the sequence of ROIs of the subject may be scanned according to the set of controlling information of the medical device. Before a scan of each ROI of the sequence of ROIs of the subject, the medical device may be switched from a previous scan state to a current scan state corresponding to the ROI according to a corresponding controlling information. The ROI may then be scanned by the medical device based on a scan protocol corresponding to the ROI. Therefore, an automatic or semi-automatic imaging isocenter alignment in a multi-region scan of the subject may be achieved.

Conventionally, in a multi-region scan of the subject, after an isocenter of the medical device is aligned with a center of a first ROI, a first scan may be performed on the first ROI. After the first scan is completed, the isocenter of the medical device may then be aligned with a center of a second ROI by a user (e.g., an operator, a doctor) of the medical system 100, which may increase the workload of the user and the time of the scan process, and reduce the efficiency of the scan process. In addition, in a multi-region enhanced scan of the subject, due to the limitation of the appearance time of the contrast agent, the time interval between scans for adjacent ROIs may be relatively short, and it is difficult for the user to align the isocenter of the medical device with the center of each ROI accurately. Misalignment of the center of the ROI with the isocenter of the medical device, a low scan throughput, and a long time interval between scans for adjacent ROIs may result in a poor imaging quality or the need for a relatively high radiation dose. Compared to the conventional way which involves a lot of human intervention, the systems and methods disclosed herein may be fully or partially automated, more accurate and efficient by, e.g., reducing unnecessary radiation to a subject and a user, the workload of a user, cross-user variations, and the time needed for the scan preparation.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the processing device 120 may determine a scan order of a plurality of ROIs of the subject based on information of each of the plurality of ROIs (e.g., a scan range of each ROI of the plurality of ROIs) and/or a scan protocol corresponding to each of the plurality of ROIs. In some embodiments, if types of the scan protocols corresponding to the plurality of ROIs are the same, the processing device 120 may determine the scan order of the plurality of ROIs of the subject such that a current scan state of the medical device for a current ROI is close to a next scan state of the medical device for a next ROI. As used herein, a first scan state of a medical device is close to a second scan state of the medical device refers to that a difference between position information of at least one component (e.g., a scanning table, a gantry) of the medical device when the medical device is in the first scan state and position information of the at least one component of the medical device when the medical device is in the second scan state is less than a threshold. For example, the processing device 120 may determine the scan order of the plurality of ROIs of the subject such that a scan end position of a current ROI is close to a scan start position of a next ROI.

For illustration purposes, in a scan process of a subject, a plurality of ROIs of the subject may include the head, the chest, and the abdomen of the subject, and the scan protocols corresponding to the plurality of ROIs may be scan protocols for plain scan. The processing device 120 may determine the scan order based on positions of the head, the chest, and the abdomen of the subject. For example, the processing device 120 may determine that the scan order of the plurality of ROIs is the head, the chest, and the abdomen of the subject. That is, a first plain scan may be performed on the head of the subject along a direction from the head to the chest of the subject based on first controlling information according to a first scan protocol corresponding to the head of the subject. After the first plain scan is completed, a second plain scan may be performed on the chest of the subject along a direction from the chest to the abdomen of the subject based on second controlling information according to a second scan protocol corresponding to the chest of the subject. After the second plain scan is completed, a third plain scan may be performed on the chest of the subject along a direction from the abdomen to the hip of the subject based on third controlling information according to a third scan protocol corresponding to the abdomen of the subject. Accordingly, after a scan of each ROI of the plurality of ROIs of the subject, the position of the isocenter of the medical device may be moved to the vicinity of a scan start position of a next ROI, thereby reducing the time required for adjusting the scan state of the medical device, and improving the scan efficiency.

In some embodiments, if types of the scan protocols corresponding to the plurality of ROIs are different, the processing device 120 may determine the scan order of the plurality of ROIs of the subject based on the scan protocols corresponding to the plurality of ROIs. That is, if the types of the scan protocols corresponding to the plurality of ROIs are different, a current scan state of the medical device for a current ROI may not need to be close to a next scan state of the medical device for a next ROI. For example, one or more plain scans may be performed on one or more ROIs of the subject, and one or more enhanced scan may then be performed on one or more ROIs of the subject. As another example, one or more localizer scans may be performed on one or more ROIs of the subject, and one or more enhanced scan or plain scans may then be performed on one or more ROIs of the subject.

In some embodiments, after the sequence of scan states of the medical device for the sequence of ROIs of the subject are determined, the processing device 120 may determine movement information of at least one component of the medical device based on the sequence of scan states of the medical device. The movement information of a component may include whether the component is moving, a moving distance of the component, a moving velocity of the component, or the like, or any combination thereof. In some embodiments, the processing device 120 may determine whether a collision is likely to occur between two objects (e.g., between two moving objects and/or between a moving object and a static object) in an examination room based on the movement information of the at least one component of the medical device. The objects in the examination room may include the at least one component of the medical device, the subject (e.g., a patient), a roof, a floor, a wall, a cable, or the like, or any combination thereof.

In some embodiments, the processing device 120 may obtain a plurality of sets of image data of a plurality of objects in the examination room at different time points. For example, the processing device 120 may obtain real-time image data of the plurality of objects in the examination room. The processing device 120 may estimate a trajectory of each object of the plurality of objects based on a plurality of positions of the object at different time points. The plurality of positions of the object at different time points may be determined based on the real-time image data of the plurality of objects. The processing device 112 may determine whether a collision is likely to occur between two objects in the examination room by determining if there is an intersection between estimated trajectories of the two objects. Additionally or alternatively, the processing device 120 may determine whether a collision is likely to occur between two objects in the examination room based on a distance between the two objects. The distance may be determined based on the real-time image data of the plurality of objects.

In response to determining that a collision is likely to occur between two objects in the examination room, the processing device 120 may cause a terminal device to generate a notification to a user (e.g., an operator). The notification may be configured to notify the user that a collision is likely to occur. For example, the notification may be provided to the user in the form of a text, a voice message, an image, a video, etc. Additionally or alternatively, in response to determining that a collision is likely to occur between two objects in the examination room, the processing device 120 may generate an instruction to decelerate or stop at least one of the two objects so as to avoid a collision. In response to determining that a collision is not likely to occur between any two objects in the examination room, the processing device 120 may generate the set of controlling information of the medical device based on the movement information of the at least one component of the medical device.

FIG. 6 is a flowchart illustrating an exemplary process for generating a set of controlling information of a medical device according to some embodiments of the present disclosure. In some embodiments, process 600 may be executed by the medical system 100. For example, the process 600 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 610, the processing device 120 (e.g., the generation module 420) may determine whether there is a preset time interval between a first scan protocol corresponding to current controlling information and a second scan protocol corresponding to previous controlling information.

In some embodiments, the processing device 120 may determine whether there is a preset time interval between the first scan protocol corresponding to the current controlling information and the second scan protocol corresponding to the previous controlling information. The current controlling information and the previous controlling information may be adjacent controlling information.

In 620, in response to determining that there is not a preset time interval between the first scan protocol corresponding to the current controlling information and the second scan protocol corresponding to the previous controlling information, the processing device 120 (e.g., the generation module 420) may determine at least one control parameter of at least one component in the current controlling information based on a preset moving velocity of the at least one component.

For example, the processing device 120 may determine the preset moving velocity of the at least one component as the control parameter of the at least one component in the current controlling information. The preset moving velocity (e.g., a preset moving speed, a preset moving direction) may be determined manually by a user (e.g., a doctor, a nurse, a technician) or by one or more components (e.g., the processing device 120) of the medical system 100 according to different situations. The preset moving velocity may be a fixed value, or a value that changes over time.

In 630, in response to determining that there is a preset time interval between the first scan protocol corresponding to the current controlling information and the second scan protocol corresponding to the previous controlling information, the processing device 120 (e.g., the generation module 420) may determine the at least one control parameter of the at least one component in the current controlling information based on the preset time interval.

In some embodiments, the processing device 120 may determine whether the medical device can be switched from a previous scan state corresponding to the previous controlling information to a current scan state corresponding to the current controlling information based on the preset time interval and the preset moving velocity of the at least one component. In response to determining that the medical device can be switched from the previous scan state corresponding to the previous controlling information to the current scan state corresponding to the current controlling information based on the preset time interval and the preset moving velocity of the at least one component (i.e., the medical device can be switched from the previous scan state corresponding to the previous controlling information to the current scan state corresponding to the current controlling information within the preset time interval according to the preset moving velocity of the at least one component), the processing device 120 may determine the at least one control parameter of the at least one component in the current controlling information based on the preset moving velocity of the at least one component. For example, the processing device 120 may determine the preset moving velocity of the at least one component as the control parameter of the at least one component in the current controlling information.

In response to determining that the medical device cannot be switched from the previous scan state corresponding to the previous controlling information to the current scan state corresponding to the current controlling information based on the preset time interval and the preset moving velocity of the at least one component (i.e., the medical device cannot be switched from the previous scan state corresponding to the previous controlling information to the current scan state corresponding to the current controlling information within the preset time interval according to the preset moving velocity of the at least one component), the processing device 120 may determine a target moving velocity of the at least one component based on the preset time interval. In some embodiments, the target moving velocity of the at least one component may be determined by multiplying the preset moving velocity of the at least one component by N (N is greater than 1), such that the medical device can be switched from the previous scan state corresponding to the previous controlling information to the current scan state corresponding to the current controlling information within the preset time interval according to the target moving velocity of the at least one component. The processing device 120 may determine the at least one control parameter of the at least one component in the current controlling information based on the target moving velocity of the at least one component. For example, the processing device 120 may determine the target moving velocity of the at least one component as the control parameter of the at least one component in the current controlling information.

According to some embodiments of the present disclosure, the at least one control parameter of the at least one component in the current controlling information may be determined based on the preset time interval between the first scan protocol corresponding to the current controlling information and the second scan protocol corresponding to the previous controlling information, the scan protocol may be performed accurately and the quality of medical imaging may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

What is claimed is:

1. A method for medical imaging, which is implemented on a computing device including at least one processor and at least one storage device, comprising:
   determining a sequence of scan states of a medical device for a sequence of regions of interest (ROIs) of a subject, each of the sequence of scan states corresponding to an ROI in the sequence of ROIs, wherein when the medical device is in a scan state of the sequence of scan states, an isocenter of the medical device is aligned with a center of the corresponding ROI;
   generating a set of controlling information of the medical device based on the sequence of scan states, wherein each of the set of controlling information is configured to switch the medical device to a corresponding scan state in the sequence of scan states; and
   controlling the medical device to scan the sequence of ROIs, wherein before scanning each of the sequence of ROIs, the medical device is positioned to the corresponding scan state according to the corresponding controlling information.

2. The method of claim 1, further comprising:
   obtaining image data of the subject; and
   obtaining the sequence of ROIs of the subject based on the image data of the subject, wherein each ROI of the sequence of ROIs corresponds to a scan protocol, and the scan protocol is used for the medical device to perform a scan on the ROI.

3. The method of claim 2, wherein the image data includes a topogram image or a depth image, the depth image is acquired by an image capturing device, and the determining a sequence of scan states of a medical device for a sequence of ROIs of a subject comprises:
   for each ROI of the sequence of ROIs,
      identifying scan information of the ROI based on the image data; and
      determining the scan state corresponding to the ROI based on the scan information of the ROI, wherein the scan state of the medical device includes position information of at least one component of the medical device.

4. The method of claim 2, wherein the controlling the medical device to scan the sequence of ROIs comprises:
   for each ROI of the sequence of ROIs,
      switching the medical device from a previous scan state to a current scan state corresponding to the ROI according to the corresponding controlling information; and controlling the medical device to scan the ROI based on the scan protocol corresponding to the ROI.

5. The method of claim 4, wherein each of the set of controlling information includes at least one control parameter of at least one component of the medical device.

6. The method of claim 5, wherein the medical device includes a scanning table, and the switching the medical device from a previous scan state to a current scan state corresponding to the ROI according to the corresponding controlling information comprises:
switching the medical device from the previous scan state to the current scan state by controlling, based on at least one control parameter of the scanning table, a movement of the scanning table.

7. The method of claim 5, wherein the medical device includes a gantry, and the switching the medical device from a previous scan state to a current scan state corresponding to the ROI according to the corresponding controlling information comprises:
switching the medical device from the previous scan state to the current scan state by controlling, based on at least one control parameter of the gantry, a movement of the gantry.

8. The method of claim 5, wherein the at least one control parameter of the at least one component is configured to control a moving velocity of the at least one component, and the generating a set of controlling information of the medical device based on the sequence of scan states comprises:
determining whether there is a preset time interval between a first scan protocol corresponding to current controlling information and a second scan protocol corresponding to previous controlling information;
in response to determining that there is not a preset time interval between the first scan protocol corresponding to the current controlling information and the second scan protocol corresponding to the previous controlling information, determining the at least one control parameter of the at least one component in the current controlling information based on a preset moving velocity of the at least one component; or
in response to determining that there is a preset time interval between the first scan protocol corresponding to the current controlling information and the second scan protocol corresponding to the previous controlling information, determining the at least one control parameter of the at least one component in the current controlling information based on the preset time interval.

9. The method of claim 8, wherein the determining the at least one control parameter of the at least one component in the current controlling information based on the preset time interval comprises:
determining whether the medical device can be switched from a previous scan state corresponding to the previous controlling information to a current scan state corresponding to the current controlling information based on the preset time interval and the preset moving velocity of the at least one component;
in response to determining that the medical device can be switched from the previous scan state corresponding to the previous controlling information to the current scan state corresponding to the current controlling information based on the preset time interval and the preset moving velocity of the at least one component, determining the at least one control parameter of the at least one component in the current controlling information based on the preset moving velocity of the at least one component; or
in response to determining that the medical device cannot be switched from the previous scan state corresponding to the previous controlling information to the current scan state corresponding to the current controlling information based on the preset time interval and the preset moving velocity of the at least one component,
determining a target moving velocity of the at least one component based on the preset time interval; and
determining the at least one control parameter of the at least one component in the current controlling information based on the target moving velocity of the at least one component.

10. A system for medical imaging, comprising:
at least one storage device including a set of instructions; and
at least one processor configured to communicate with the at least one storage device, wherein when executing the set of instructions, the at least one processor is configured to direct the system to perform operations including:
determining a sequence of scan states of a medical device for a sequence of regions of interest (ROIs) of a subject, each of the sequence of scan states corresponding to an ROI in the sequence of ROIs, wherein when the medical device is in a scan state of the sequence of scan states, an isocenter of the medical device is aligned with a center of the corresponding ROI;
generating a set of controlling information of the medical device based on the sequence of scan states, wherein each of the set of controlling information is configured to switch the medical device to a corresponding scan state in the sequence of scan states; and
controlling the medical device to scan the sequence of ROIs, wherein before scanning each of the sequence of ROIs, the medical device is positioned to the corresponding scan state according to the corresponding controlling information.

11. The system of claim 10, wherein the at least one processor is configured to direct the system to perform operations including:
obtaining image data of the subject; and
obtaining the sequence of ROIs of the subject based on the image data of the subject, wherein each ROI of the sequence of ROIs corresponds to a scan protocol, and the scan protocol is used for the medical device to perform a scan on the ROI.

12. The system of claim 11, wherein the image data includes a topogram image or a depth image, the depth image is acquired by an image capturing device, and the determining a sequence of scan states of a medical device for a sequence of ROIs of a subject comprises:
for each ROI of the sequence of ROIs,
identifying scan information of the ROI based on the image data; and
determining the scan state corresponding to the ROI based on the scan information of the ROI, wherein the scan state of the medical device includes position information of at least one component of the medical device.

13. The system of claim 11, wherein the controlling the medical device to scan the sequence of ROIs comprises:
for each ROI of the sequence of ROIs,
switching the medical device from a previous scan state to a current scan state corresponding to the ROI according to the corresponding controlling information; and
controlling the medical device to scan the ROI based on the scan protocol corresponding to the ROI.

14. The system of claim 13, wherein each of the set of controlling information includes at least one control parameter of at least one component of the medical device.

15. The system of claim 14, wherein the medical device includes a scanning table, and the switching the medical device from a previous scan state to a current scan state corresponding to the ROI according to the corresponding controlling information comprises:
switching the medical device from the previous scan state to the current scan state by controlling, based on at least one control parameter of the scanning table, a movement of the scanning table.

16. The system of claim 14, wherein the medical device includes a gantry, and the switching the medical device from a previous scan state to a current scan state corresponding to the ROI according to the corresponding controlling information comprises:
switching the medical device from the previous scan state to the current scan state by controlling, based on at least one control parameter of the gantry, a movement of the gantry.

17. The system of claim 14, wherein the at least one control parameter of the at least one component is configured to control a moving velocity of the at least one component, and the generating a set of controlling information of the medical device based on the sequence of scan states comprises:
determining whether there is a preset time interval between a first scan protocol corresponding to current controlling information and a second scan protocol corresponding to previous controlling information; and
in response to determining that there is not a preset time interval between the first scan protocol corresponding to the current controlling information and the second scan protocol corresponding to the previous controlling information, determining the at least one control parameter of the at least one component in the current controlling information based on a preset moving velocity of the at least one component.

18. The system of claim 17, wherein the generating a set of controlling information of the medical device based on the sequence of scan states comprises:
in response to determining that there is a preset time interval between the first scan protocol corresponding to the current controlling information and the second scan protocol corresponding to the previous controlling information, determining the at least one control parameter of the at least one component in the current controlling information based on the preset time interval.

19. The system of claim 18, wherein the determining the at least one control parameter of the at least one component in the current controlling information based on the preset time interval comprises:
determining whether the medical device can be switched from a previous scan state corresponding to the previous controlling information to a current scan state corresponding to the current controlling information based on the preset time interval and the preset moving velocity of the at least one component;
in response to determining that the medical device can be switched from the previous scan state corresponding to the previous controlling information to the current scan state corresponding to the current controlling information based on the preset time interval and the preset moving velocity of the at least one component, determining the at least one control parameter of the at least one component in the current controlling information based on the preset moving velocity of the at least one component; or
in response to determining that the medical device cannot be switched from the previous scan state corresponding to the previous controlling information to the current scan state corresponding to the current controlling information based on the preset time interval and the preset moving velocity of the at least one component, determining a target moving velocity of the at least one component based on the preset time interval; and
determining the at least one control parameter of the at least one component in the current controlling information based on the target moving velocity of the at least one component.

20. A non-transitory computer readable medium, comprising executable instructions that, when executed by at least one processor, direct the at least one processor to perform a method for motion correction, the method comprising:
determining a sequence of scan states of a medical device for a sequence of regions of interest (ROIs) of a subject, each of the sequence of scan states corresponding to an ROI in the sequence of ROIs, wherein when the medical device is in a scan state of the sequence of scan states, an isocenter of the medical device is aligned with a center of the corresponding ROI;
generating a set of controlling information of the medical device based on the sequence of scan states, wherein each of the set of controlling information is configured to switch the medical device to a corresponding scan state in the sequence of scan states; and
controlling the medical device to scan the sequence of ROIs, wherein before scanning each of the sequence of ROIs, the medical device is positioned to the corresponding scan state according to the corresponding controlling information.

* * * * *